(12) United States Patent
Krug

(10) Patent No.: US 8,826,317 B2
(45) Date of Patent: Sep. 2, 2014

(54) SYSTEM AND METHOD FOR DETERMINING BROADCAST DIMENSIONALITY

(75) Inventor: William K. Krug, Daytona Beach, FL (US)

(73) Assignee: The Nielson Company (US), LLC, Schaumburg, IL (US)

( * ) Notice: Subject to any disclaimer, the term of this patent is extended or adjusted under 35 U.S.C. 154(b) by 566 days.

(21) Appl. No.: 12/425,504

(22) Filed: Apr. 17, 2009

(65) Prior Publication Data

US 2010/0269127 A1 Oct. 21, 2010

(51) Int. Cl.
 *H04N 7/16* (2011.01)
(52) U.S. Cl.
 USPC .......................................................... 725/20
(58) Field of Classification Search
 None
 See application file for complete search history.

(56) References Cited

U.S. PATENT DOCUMENTS

| | | | |
|---|---|---|---|
| 5,483,276 A | | 1/1996 | Brooks et al. |
| 7,316,025 B1 * | | 1/2008 | Aijala et al. ................... 725/18 |
| 7,739,140 B2 * | | 6/2010 | Vinson et al. ................. 705/7.32 |
| 8,266,645 B2 * | | 9/2012 | Deng ............................. 725/18 |
| 2004/0019463 A1 | | 1/2004 | Kolessar |
| 2005/0216509 A1 | | 9/2005 | Kolessar |
| 2008/0091512 A1 | | 4/2008 | Marci et al. |
| 2009/0037575 A1 * | | 2/2009 | Crystal et al. ................. 709/224 |
| 2010/0070987 A1 * | | 3/2010 | Amento et al. ................. 725/10 |

FOREIGN PATENT DOCUMENTS

| | | |
|---|---|---|
| EP | 1494374 | 1/2005 |
| WO | WO2008108806 | 9/2008 |

OTHER PUBLICATIONS

International Search Report for PCT/US2010/031458 mailed Jul. 7, 2010.
Supplementary European Search Report Appl. No. 10765290, dated Dec. 18, 2012.
Australian Government, IP Australia, "Patent Examination Report No. 1," issued in connection with Australian Patent Application No. 2010236204 on Jun. 24, 2014 (3 pages).

\* cited by examiner

*Primary Examiner* — Benjamin Sandvik
(74) *Attorney, Agent, or Firm* — Hanley, Flight and Zimmerman, LLC

(57) ABSTRACT

An apparatus, system and method for determining levels of audience engagement relative to encoded audio data, where an encoded audio data is captured in a mobile device. The audio data is captured over one or more predetermined time periods, and processed to determine characteristics of the audio data. The characteristics are determined according to one or more predetermined thresholds, where volume levels, levels of encoding, and or other features are monitored. By determining levels in the audio data that exceed predetermined thresholds, engagement levels and values may be determined relative to the audio data captured over the time period. Data from preceding time periods may be compared to obtain comprehensive engagement data for audience measurement systems.

22 Claims, 6 Drawing Sheets

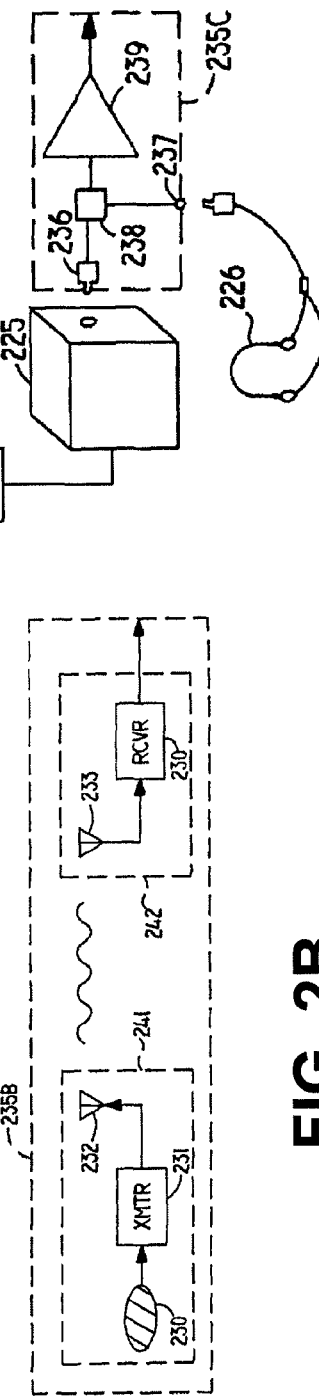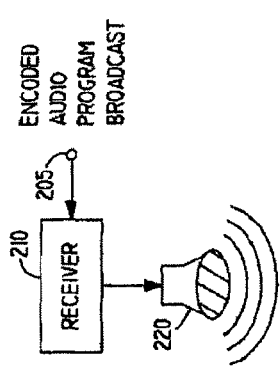

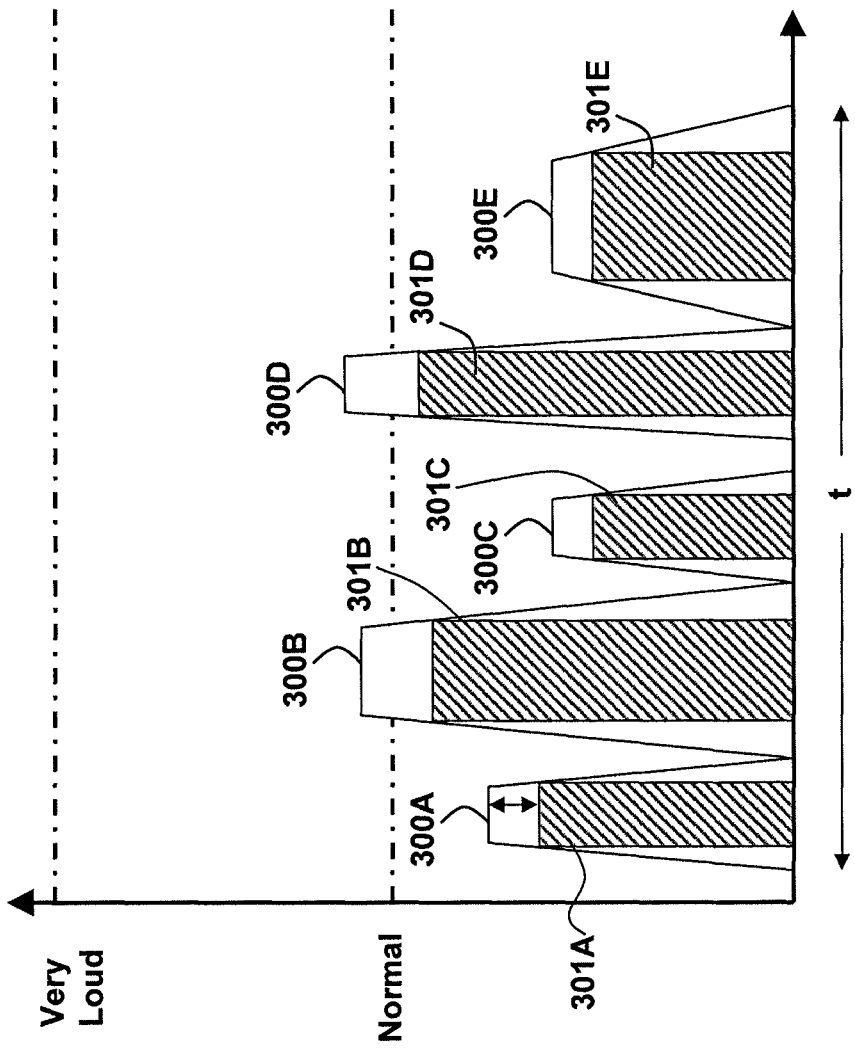

SYSTEM AND METHOD FOR DETERMINING BROADCAST DIMENSIONALITY

TECHNICAL FIELD

The present disclosure relates to systems and processes for forming and analyzing encoded data, and, more specifically, to processing media data that includes coding that provides media and/or market research.

BACKGROUND INFORMATION

Broadcast segments include live programs, taped programs, streaming programs, commercials and the like. These segments may be aired according to a wide variety of schedules, for example, national coverage, particular geographic coverage or to fill otherwise unreserved programming slots. Furthermore, the scheduled broadcast time may be uniform nationwide or vary according to a broadcaster's local considerations.

Conventional systems exist where segments may be independently detected to determine when segments, such as performances, scenes, commercials, or the like were actually broadcast over a given channel or by a given station.

One such system involves the use of passive recording methods that are characterized by the presence of a device that attempts to sense, in real time, the broadcast segments to which an audience member is exposed and record this information, which would later be retrieved at or uploaded to a centralized data processing facility. Since the information would be collected in computer readable form, data processing could be carried out readily with the use of a passive recording apparatus. Information collected by passive recording would be free of human error, and in this respect would enjoy improved reliability.

Devices known as "personal passive people meters", which are small and portable, have been proposed. Such devices are intended to be carried by persons whose broadcast segment exposure would be monitored. These meters would permit viewer/listener determination at the individual level, which is highly desirable. Such meters may be optimized to correctly sense the segment to which a viewer is being exposed. Under certain proposed approaches, the meter may attempt to identify both unmodified broadcast segments, and segments modified before broadcast to make them more readily identifiable.

One approach to identification of unmodified segments involves pattern recognition. Each segment is analyzed before or after broadcast and its analyzed characteristics determine its "broadcast signature". A table of broadcast signatures is created by, or made available to, each monitoring station. In operation, a monitoring station attempts to analyze the characteristics of a segment being broadcast and match it to one of the broadcast signatures, that is, recognize its pattern.

Several other identification approaches involve modifying the broadcast segments to provide a code which the detecting equipment is designed to recognize. An advantage of these approaches is that the monitoring stations need not be updated as new broadcast segments are created. Other approaches (such as the one proposed in U.S. Pat. No. 3,004,104) propose to suppress a narrow band of frequencies (10 Hz wide) in a portion of the voiceband (1000 Hz) at timed intervals according to a predetermined code. Still other approaches seek to modulate the audio frequency subcarrier with an identifying code of narrow bandwidth (100 Hz) and short duration (3 seconds) at the start and end of each segment. Still other approaches propose to mix subaudible-frequency identifying codes with conventional audio in the program segments. A technique proposed for use with a musical recording comprises eliminating a sequence of six frequency bands from an audio signal, with the sequence varying during the course of the signal, and in place of the eliminated frequencies, inserting a sequence of code signals.

A more advantageous approach to identifying broadcast segments is disclosed in U.S. Pat. No. 7,316,025, titled "Method and Apparatus for Encoding/Decoding Broadcast or Recorded Segments and Monitoring Audience Exposure Thereto," which is incorporated by reference in its entirety herein. Under this approach, information is encoded in broadcast or recorded audio signals. A code signal having a predetermined bandwidth is modulated with an identification signal having a narrower bandwidth than the predetermined bandwidth to produce an encoded signal. The encoded identification signal is mixed with the broadcast or recorded audio signal to produce an output signal.

The audio signal portion may be correlated with a copy of the code signal to recover the identification signal. The correlating may be carried out by a personal unit worn or carried on the person of an audience member, that produces a record of the broadcast or recorded segments to which the audience member has been exposed. This record, with identification of the audience member, is uploaded to a centralized facility. Systems and methods for further processing the information for obtaining useful audience measurement data is disclosed in U.S. Pat. No. 7,222,071, titled "Audio Data Receipt/Exposure Measurement With Code Monitoring and Signature Extraction," and U.S. Pat. No. 7,239,981, titled "Systems and Methods For Gathering Audience Measurement Data", both of which are incorporated by reference in their entirety herein.

While various systems and methods have been proposed for audience measurement, little to no technical proposals have been made to measure and/or quantify audience engagement. Specifically, there is a need to objectively determine and/or measure levels of audience engagement, e.g., how "enthused" an audience member is with the content.

SUMMARY

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, datasets, files, broadcasts, displays (including but not limited to video displays, posters and billboards), signs, signals, web pages and streaming media data.

The term "database" as used herein means an organized body of related data, regardless of the manner in which the data or the organized body thereof is represented. For example, the organized body of related data may be in the form of a table, a map, a grid, a packet, a datagram, a file, a document, a list or in any other form.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate," "communicating" and "communication" as used herein include both conveying data from a source to a destination, and delivering data to a communications medium, system, channel, device or link to be conveyed to a destination.

The term "processor" as used herein means processing devices, apparatus, programs, circuits, components, systems and subsystems, whether implemented in hardware, software or both, whether or not programmable and regardless of the form of data processed, and whether or not programmable. The term "processor" as used herein includes, but is not limited to computers, hardwired circuits, signal modifying devices and systems, devices and machines for controlling systems, central processing units, programmable devices, state machines, virtual machines and combinations of any of the foregoing.

The terms "storage" and "data storage" as used herein mean data storage devices, apparatus, programs, circuits, components, systems, subsystems and storage media serving to retain data, whether on a temporary or permanent basis, and to provide such retained data.

In accordance with various embodiments, systems, apparatuses and methods are disclosed for determining and/or measuring levels of audience engagement by analyzing and processing encoded media data relative to ambient background audio levels. Under one exemplary embodiment, absolute listening levels of encoded media data are monitored o establish engagement. Under another exemplary embodiment, absolute listening levels are compensated to adjust for background noise. Under other embodiments, external inputs from a metering device (i.e., "Personal People Meter") are used in combination with the encoded media data to determine levels of engagement. The external inputs include, but are not limited to, data relating to biometric feedback such as motion, heart rate, skin temperature, etc.

The above, and other objects, features and advantages of the present disclosure will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIGS. 2A, 2B and 2C are block diagrams of personal monitors for use with the encoder of FIG. 1;

FIG. 3 illustrates an exemplary embodiment of an audio signal captured for a predetermined period of time, where a first level of engagement is determined;

DETAILED DESCRIPTION

Figure 1:
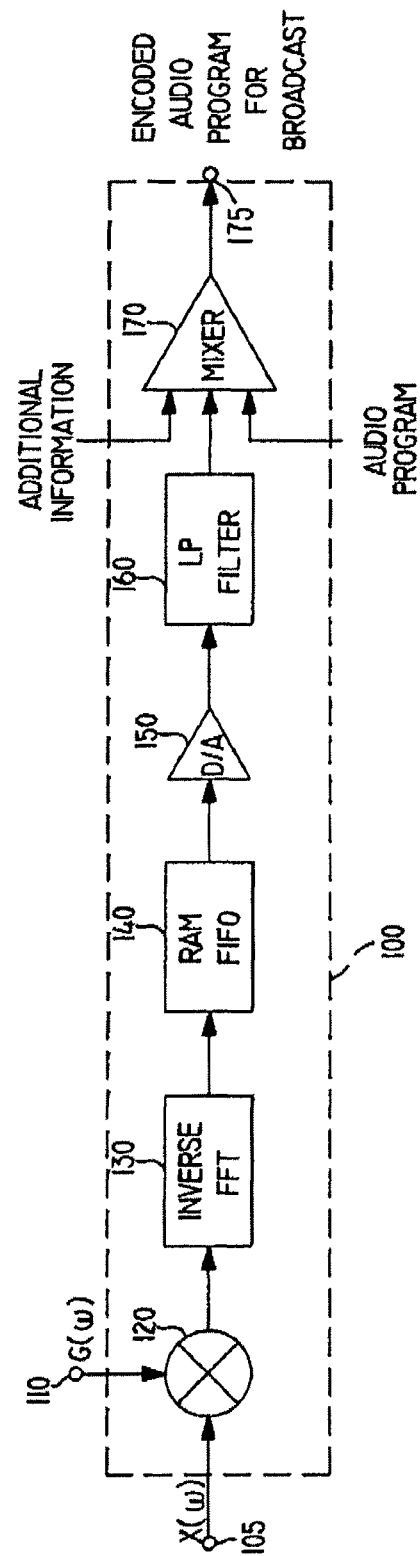
FIG. 1 is a block diagram of an encoder in accordance with an embodiment of the present invention.

In the exemplary embodiment of FIG. 1, an encoder is disclosed that adds identifying information to an audio portion of a broadcast segment before the segment is broadcast using a spread spectrum technique selected from among several alternatives, and includes a passive monitoring device that operates without human action to sense the identifying information in the broadcast segment and record it. The terms "meter" and "metering device" are sometimes used herein to refer to devices such as passive broadcast monitoring devices. At periodic intervals, the recorded information in each meter is uploaded to a centralized data processing facility for permanent storage.

In such embodiments, spread spectrum techniques employed typically will encode identifying information having a relatively low data rate and formed into an identification signal having a narrow bandwidth. As used herein, the term "signal" includes both an electrical signal and a representation of information which is stored, processed and/or transmitted, as well as any other form in which information is embodied. The term "bandwidth" as used herein includes a difference between frequency band limits as well as a frequency interval or range of frequencies. The explanations of terms as used herein are provided for exemplary purposes, and are not intended to be limiting, as appropriate other meanings for such terms may occur to those of ordinary skill in the art. In an advantageous embodiment, the thus-formed identification signal is modulated by a code signal, also known as a spreading signal, which is independent of the data and has a much wider bandwidth.

The code signal may be a pseudo-random signal which, after modulation with a broadcast segment, will be perceived, if at all, as a low-level white noise, generally referred to as hiss, and not as information. The code signal is mixed into the audio signal at a level sufficiently below the regular broadcast audio signal level to make it imperceptible as information, and in the alternative, may be mixed with the audio signal at lower levels depending on the manner in which the audio signal is acquired for decoding, for example, as a baseband signal versus an acoustically reproduced signal.

One advantageous code is a sequence of tones added to the voiceband, which occupies approximately 300-3,000 Hz, since all broadcast formats and all reception equipment provide for reproduction of voice information of at least reasonable quality.

At each metering device, the audio signal portion of the broadcast segment is subjected to a correlation process, such as one of the processes described below, with a synchronized reference copy of the code signal to recover the identification signal, compared with valid information items (such as valid channels in the relevant geographic area), and subsequently stored.

Due to the use of spread spectrum encoding, the identifying information may be successfully recovered despite the presence of substantial ambient noise in the audio bandwidth in which the code signal is transmitted. Furthermore, the encoded identification signal can be made imperceptible to the audience.

In certain embodiments, the audio signal portion, typically 20-22,000 Hz, of a segment to be broadcasted is encoded with station, channel or other program source identifying information by mixing it with a code signal modulated with an information signal which conveys this information. The information uniquely identifies the particular broadcasting source. The amount of information per broadcast segment can be kept short, if only broadcast times and the source of the broadcast, that is, the station or channel and not necessarily the identity of the program segment, are transmitted.

A passive meter, preferably worn by a selected member of the audience on his or her person, recovers the source identifier and stores it in a local memory with a time and date stamp. At the end of each day, the meter is put into a base unit so it can be recharged, its recorded information can be extracted, and, if desired, new information can be loaded into the meter. The extracted information may be collected by a storage and transmission unit in the household, and either the base unit or the storage and transmission unit may be employed to transmit the information over a dial-up telephone line to a centralized facility when the telephone line is not used by a member of the household. Several passive meters can be served by a single base unit or storage and transmission unit. Alternatively, the meter may be physically sent to a centralized facility to extract its recorded data.

Furthermore, additional information regarding the broadcast segment, for example, identifying the particular program or commercial, is also encoded into the audio signal portion of the segment. This additional information may use a code signal having a frequency range substantially coextensive with the full range of the audio signal, or having a range above the voiceband but within the audio signal range, for example, 4,000-20,000 Hz. Alternatively, the additional information may be formed into an additional information signal which directly modulates the audio signal, that is, without spread spectrum encoding, below or above the voiceband, or which modulates another portion of a broadcast segment, such as a video signal.

A separate monitoring device receives the baseband broadcast segment and extracts therefrom the additional information regarding the broadcast segment, and sends it to the centralized data processing facility where it is matched with the source identification information from the personal monitoring devices, to provide a full audience record of who was exposed to what, and when. Alternatively, the separate monitoring device may be located at the broadcast site, for example, at the headend of a cable system, and may monitor the signals immediately before they are cablecast.

An advantageous method for spread spectrum encoding of the source identification information utilizes direct sequence encoding in the frequency domain. Alternative methods include direct sequence encoding in the time domain, and frequency hopping. Each of these methods is further described below. However, the present invention is not limited to these methods, and other spread spectrum methods using time hopping or pulse-FM systems, or a hybrid method, are feasible.

An embodiment of the present invention will now be described in connection with FIG. 1, which shows an encoder, and FIGS. 2A-C, which show various aspect of a personal monitor.

FIG. 1 shows an advantageous embodiment of an encoder 100. Encoder 100 includes input terminals 105 and 110, modulator 120, inverse transformer 130, buffer 140, digital-to-analog (D/A) converter 150, low pass filter 160, mixer 170 and output terminal 175. Source identification signal $X(\omega)$, composed in bit form in the frequency domain, is supplied to the input terminal 105, while a frequency domain antipodal code signal $G(\omega)$ also in bit form is supplied to the input terminal 110. An antipodal signal has only opposed values, such as "1" and "−1". In this instance, the values of both $X(\omega)$ and $G(\omega)$ are composed of real numbers, and imaginary portions thereof are set of zero. These signals are described in detail below.

As used herein, "bit" refers to a unit of data, such as a portion of a source identifier, and "chip" refers to an elementary unit of a code. One bit corresponds to many chips, since the bandwidth of the information signal is narrower than the predetermined bandwidth of the code signal. In the frequency domain, each chip is represented by a "point" which is essentially a data value.

The code signal can be changed, for example, on a daily basis, to meet a variety of needs, such as identification of taped replays, limiting the collected data to a predetermined survey time period, or discouraging unauthorized access. Code signals can be provided to one or more encoders from a centralized facility via any of a number of transmission techniques. For example, the code signals can be transmitted via the public switched telephone network, a local area network, satellite transmission, or as data encoded in a broadcast. Use of different codes for radio and television enables the same personal monitor to collect radio or TV only data. Alternatively, codes may be assigned based on geographic location, or to restrict audience exposure monitoring to only commercial advertisements.

The source identification signal, $X(\omega)$, and the code signal, $G(\omega)$, are supplied to modulator 120, which modulates these signals using, for example, direct multiplication, logical exclusive OR, or another combining technique for individual frequency components, to form a frequency domain encoded source identification signal. A frequency domain encoded signal, when properly selected, has the property of matching its spectrum to the typical frequency response of the receiver circuitry and speaker in use by an audience member, as well as to compensate for the room or other acoustic environment in which monitoring will occur.

The frequency domain encoded source identification signal is supplied to inverse transformer 130, which performs an inverse fast Fourier transform (FFT) or wavelet transform so as to produce a time domain encoded source identification signal that is supplied to buffer 140, which holds, for example, 2,048 data items, and is shown as a random access memory used according to a first-in-first-out scheme. The contents of buffer 140 are fed to D/A converter 150, which is a 16-bit converter, for example, thereby providing about a 90 dB range of levels in the analog encoded identification signal.

In one embodiment, the converter 150 samples at a rate of 8,192 samples per second. The length of buffer 140 corresponds to one bit time at the selected sampling rate, that is, (8,192 samples per second)/(4 bits per second)=2,048 samples/bit. The corresponding FFT has a length of 1024 points in the frequency domain, with each point corresponding to 4 Hz. The 676 points within the frequency range 300-3,000 Hz are used, while the 75 points corresponding to the range 0-296 Hz and the 273 points within the range 3004-4092 Hz are not used. The analog encoded identification signal is supplied to low pass filter 160, which removes spurious signals outside of the desired range.

At the mixer 170, the filtered encoded identification signal is combined with the audio portion of a segment in a ratio selected to maintain inaudibility and supplied to an output terminal 175 of the encoder 100, and is then broadcast with the other portions of the segment, if any, in a conventional manner such as by RF, satellite or cable broadcast, or is recorded on tape or other recording medium. The level at which the encoded identification signal is combined is chosen to be approximately the normal noise level tolerated by most audio programs. Additional information, intended for a monitoring device distinct from the personal monitor, may also be separately supplied to mixer 170, for combination with the encoded identification signal and audio portion.

The modulating through mixing processing steps performed in the aforementioned elements of the encoder 100 are repeated until the source identification information is fully encoded in the audio portion of the segment to be broadcast or recorded. These steps can be repeated to encode the source identification in various places or continuously through the audio portion of the segment. The succeeding identification information may be changed to reflect a change in the source of the segment, or as otherwise appropriate.

FIG. 2A shows one advantageous embodiment of a personal monitor 200. Personal monitor 200 includes a microphone 230, amplifier 240, low pass filter 250, analog-to-digital (A/D) converter 255, buffer 260, transformer 265, correlator 270, input terminals 275 and 285, combiner 280, and memory 290. The outer dashed line in FIG. 2A generally indicates the enclosure of a metering device to be worn on the person, e.g., clipped to a garment worn by the audience member.

As shown in FIG. 2A, the encoded audio portion of the broadcast segment is received at an input terminal 205 of a typical broadcast receiver 210, which acoustically reproduces the audio portion using a speaker 220. Receiver 210 and its speaker 220 represent devices normally used in households and elsewhere by audience members to acoustically reproduce broadcast audio signals. Alternatively, a recorded segment containing an encoded audio portion may be reproduced, such as by a video cassette recorder, and the audio portion thereof acoustically reproduced by a speaker such as speaker 220.

The acoustically reproduced audio portion of the broadcast or recorded segment is received by the microphone 230 of the personal monitor 200, which transduces the acoustic energy into an electrical signal. The transduced electrical signal is supplied, via a physical line or wireless transmission, to amplifier 240 shown as an automatic gain control amplifier, which produces an output signal at an increased power level.

In FIG. 2A, the combination 235A of microphone 230 and amplifier 240 is shown as contained within the personal monitor 200 worn by an audience member. An alternative arrangement is depicted in FIG. 2B, showing a combination 235B which functionally corresponds to the combination 235A. The combination 235B includes a first unit 241, intended to be worn by an audience member and physically separate from the remainder of monitor 200, and a second unit 242 contained within an enclosure containing the remainder of monitor 200. The arrangement shown in FIG. 2B is intended especially for situations where the audience member is a child, or other situations where miniaturization of the apparatus worn by the audience member is advantageous.

The first unit 241 of combination 235B comprises microphone 230, transmitter 231 and antenna 232. The transduced electrical signal from microphone 230 is supplied to a transmitter 231 which is adapted for generating a signal suitable for wireless transmission from the transduced signal, which is supplied to antenna 232. The antenna 232 serves to produce a wireless transmission of the signal from transmitter 231.

The second unit 242 of combination 235B comprises antenna 233 and receiver 234. The antenna 233 is operative to receive the wireless broadcast from antenna 232, and convert it into a received electrical signal which is supplied to receiver 234 which serves to produce an output signal at an increased power level, corresponding to the output of amplifier 240.

FIG. 2C shows another alternative and exemplary combination 235C, for use when the audience member is exposed to radio broadcasts or reproduced sound via a portable device 225 carried on the person, typically used with headphones 226. An engagement sensor 222, such as an accelerometer, may provide input to portable device 225, where sensor 222 provides data relating to physical movement of a user. Sensor 222 may be integrated into device 225, or may be a separate component.

In certain embodiments sensor 222 monitors and reports one or more parameters, such as biometric parameters, including a user's heart activity, a user's brain activity, a user's breathing activity, a user's pulse, a user's blood oxygenation, a user's borborygmus (gastrointestinal noise), a user's gait, a user's voice, a user's key, keypad or keyboard usage characteristics (e.g., keystroke recognition), a user's vascular pattern, a user's facial or ear patterns, a user's signature, a user's fingerprint, a user's handprint or hand geometry, a user's retinal or iris patterns, a user's airborne biochemical indicators (sometimes referred to as a user's "smellprint"), a user's muscular activity, a user's body temperature, Additionally, sensor 222 monitors and reports sounds external to portable device 225 (e.g., "wow!", "cool!", "I like that!"), an impact of portable device with another object, motion of the portable device, proximity of the portable device to the person of a user, pressure applied to portable device, recharging of the portable device, its power capacity, docking of the portable device, data input (e.g., messages) to the portable device, location of the portable device and/or changes in the portable device's location.

The combination 235C includes an input terminal 236, which may be a jack, an output terminal 237, which may be a plug, a splitter 238, which may be simply a Y-cable, and an amplifier 239. The input terminal 236 is adapted to be coupled to the portable device 225, and to receive therefrom a broadcast audio signal which is supplied to splitter 238. The splitter 238 is operative to supply a copy of the signal from input terminal 236 to both amplifier 239 and output terminal 237. The amplifier 239 produces an output signal at an increased power level.

The signal from amplifier 240, receiver 234 or amplifier 239 is supplied to A/D convertor 255 via filter 250. The level of the amplified signal corresponds to about 50% of the maximum range of the convertor 255. Filter 250 performs low pass filtering on the amplified signal to remove any frequencies above the maximum frequency of the code signal, which is 3,000 Hz in one embodiment, preventing higher frequency information from being aliased into the frequency domain in which the encoded information is present.

Convertor 255 converts the filtered signal to a series of 16-bit values, and supplies these values as a converted signal to buffer 260, which stores the converted values before supplying them to transformer 265 where they undergo a transformation to the frequency domain, such as a fast Fourier transform or wavelet transform. Buffer 260 stores the values in a manner which permits a sliding transform to be performed for the purposes of synchronization and tracking, discussed below.

The frequency domain signal and a copy of the code signal $G(\omega)$ supplied at input terminal 275 are transmitted to correlator 270, which correlates these signals to produce a recovered source identification signal $X'(\omega)$. As part of the correlation process, the copy of the code signal $G(\omega)$ is synchronized with the received signal by appropriately adjusting readout from the buffer 260, as described above, to ensure that the FFT or wavelet transform occurs with the correct set of time domain data. The code signal may be hardwired into the personal monitor, but preferably is downloaded thereto to facilitate changing of the code, as discussed above. Signal recovery and synchronization are explained in more detail below.

Although it is not shown for ease of illustration, a central processing unit may be provided within personal monitor 200 to assist in the synchronization and other data management functions.

The correlator 270 produces an output signal, representing bits corresponding to the recovered source identification signal $X'(\omega)$, which is combined with a timestamp supplied at input terminal 285 and transmitted to memory 290 for storage, and subsequently transferred to a centralized data processing facility with additional information to identify the audience member. The additional information may be a serial number or other identifier assigned to the monitor 200, which is used by the centralized facility as an index to a look-up table associating monitor serial numbers with audience members. The additional information may be stored in the memory 290, or, for example, in a ROM. In the case of the embodiment of FIG. 2B, the transmitter 231 transmits an appropriate serial number or identifier for identifying the person wearing the unit to be combined with the timestamp, as described above, for transmission to the centralized data processing facility as such additional information. This permits the use of a single wireless transmission channel. In the alternative, each wireless transmitter 231 for use within a given household is assigned a unique transmission channel which enables the monitor 200 to identify the wireless transmitter 231 and, thus, the corresponding audience member.

This transfer of the information from memory 290 may occur by physically delivering the personal monitor to the centralized facility, or by reading out the timestamped data to a base station located, for example, in the residence of the audience member, and then through a dial-up communication link between the base station and centralized facility.

For the media data encoding, several advantageous and suitable techniques for encoding audience measurement data in audio data are disclosed in U.S. Pat. No. 5,764,763 to James M. Jensen, et al., which is assigned to the assignee of the present application, and which is incorporated by reference herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

Still other suitable encoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al, all of which are incorporated herein by reference.

On the decoding side, there are several possible embodiments of decoding techniques that can be implemented for use in the present invention. Several advantageous techniques for detecting encoded audience measurement data are disclosed in U.S. Pat. No. 5,764,763 to James M. Jensen, et al., which is assigned to the assignee of the present application, and which is incorporated by reference herein. Other appropriate decoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

Still other suitable decoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al., all of which are incorporated herein by reference.

Turning to FIG. 3, an exemplary encoded audio signal is illustrated, where the encoded signal is used to determine audience engagement. The audio signal is shown having audio segments (300A-E), where appropriate segments have codes (301A-E) inserted in their respective segments, in accordance with any of the techniques mentioned above. Codes 301A-E should contain sufficient information to identify characteristics of the audio, such as performance and/or artist, station identification, timestamp data, etc. Audio segments (300A-E) are preferably captured on a device using such methods as passive sampling, sampled over a predetermined time period (t), such as 15 seconds.

As the audio segments (300A-E) and codes (301A-E) are captured, the device can determine the relative strength of the audio signal by comparing the signal with the encoding level (illustrated by the arrow shown between audio segment (300A) and respective code (301A) in FIG. 3). By setting a predetermined threshold for listening levels (e.g., the "Normal" line, illustrated on the audio level y-axis of FIG. 3), listener engagement may be measured on the device, and listener engagement values may be determined. Thus, in the example of FIG. 3, listener engagement may processed as being at normal levels relative to the threshold. The level of engagement and engagement values may be measured by any one of the following methods: (1) predetermined number of peaks (audio signal and/or encoding) that exceed the threshold within the sampling period; (2) a predetermined percentage of the audio signal and/or encoding that exceeds the threshold within the sampling period; and (3) encoding levels that exceed the threshold within the sampling period.

The sampling period may be selected as a shorter period (e.g., 1-30 seconds), or a longer period (e.g., 30 seconds-2 minutes). If a shorter period is chosen, then listener engagement may be measured and processed using a current sampling period, and comparing the processed results against one or more previous sampling periods. If the levels are increasing or decreasing across multiple time periods, and overall audience engagement profile may be constructed over a period of interest (e.g., length of a radio or television show).

The same can be done with longer periods, however, the time period may be selected towards a short dedicated event (e.g., commercial), and the listener engagement may be determined by comparing events against each other and the time they were shown. Thus, for example, listener engagement for a particular commercial may be calculated throughout a viewing day to see what times garner the highest audience engagement.

Figure 4:
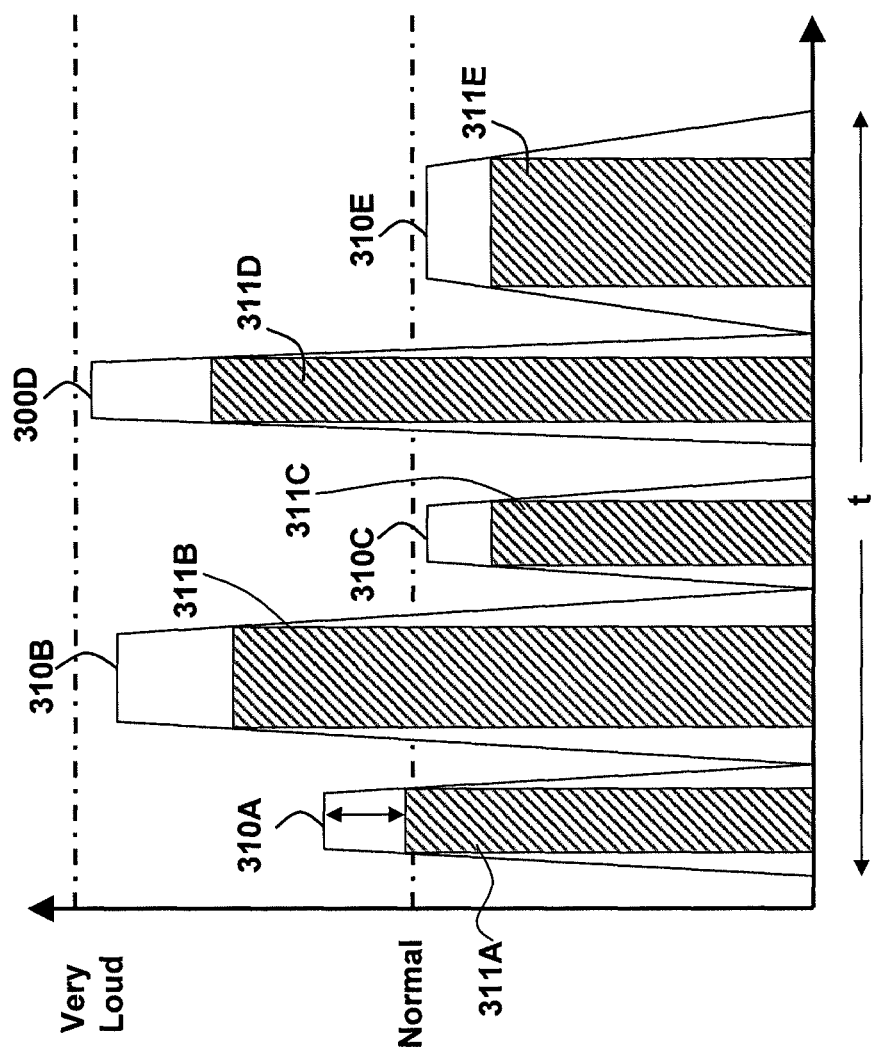
FIG. 4 illustrates another exemplary embodiment of an audio signal captured for a predetermined period of time, where a second level of engagement is determined

Continuing with the example, FIG. 4 illustrates an audio signal similar to the one shown in FIG. 3, having audio segments (310A-E) and codes (311A-E) captured for a predetermined period of time (t). In FIG. 4, it can be seen that the level of listener engagement is higher that that in FIG. 3. The higher level of engagement may be measured by (1) predetermined number of peaks (audio signal and/or encoding) that exceed a first and/or second ("Very Loud") threshold within the sampling period; (2) a predetermined percentage of the audio signal and/or encoding that exceeds a first and/or second threshold within the sampling period; and (3) encoding levels that exceed a first and/or threshold within the sampling period.

Figure 5:
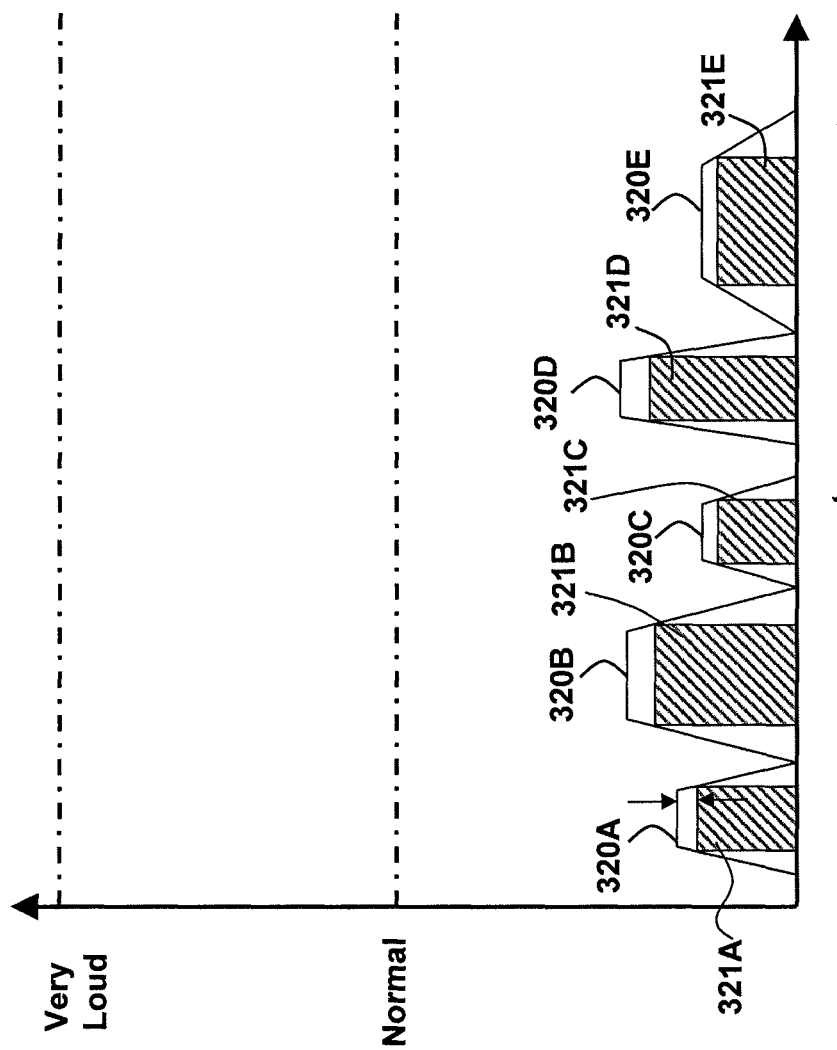
FIG. 5 illustrates yet another exemplary embodiment of an audio signal captured for a predetermined period of time, where a third level of engagement is determined.

In FIG. 5, the example continues from the examples of FIG. 4 and FIG.3, showing an audio signal having audio segments (320A-320E) and respective codes (321A-321E) captured for a predetermined period of time (t). In FIG. 5, it can be seen that the level of listener engagement is lower than that in FIG. 3, and much lower than FIG. 4. The lower level of engagement, during periods of known audio transmission, may be measured by (1) the lack of predetermined number of peaks (audio signal and/or encoding) that exceed a first threshold within the sampling period; (2) a predetermined percentage of the audio signal and/or encoding that fail to exceed a threshold within the sampling period; and (3) encoding levels that fail to exceed a threshold within the sampling period.

Accordingly, normal absolute listening levels and constant encoding levels indicate "normal" or baseline engagement. Higher absolute listening levels (without interfering background noise) indicate a higher level of engagement. Lower absolute listening levels (without interfering background noise) indicate a lower level of engagement.

Figure 6:
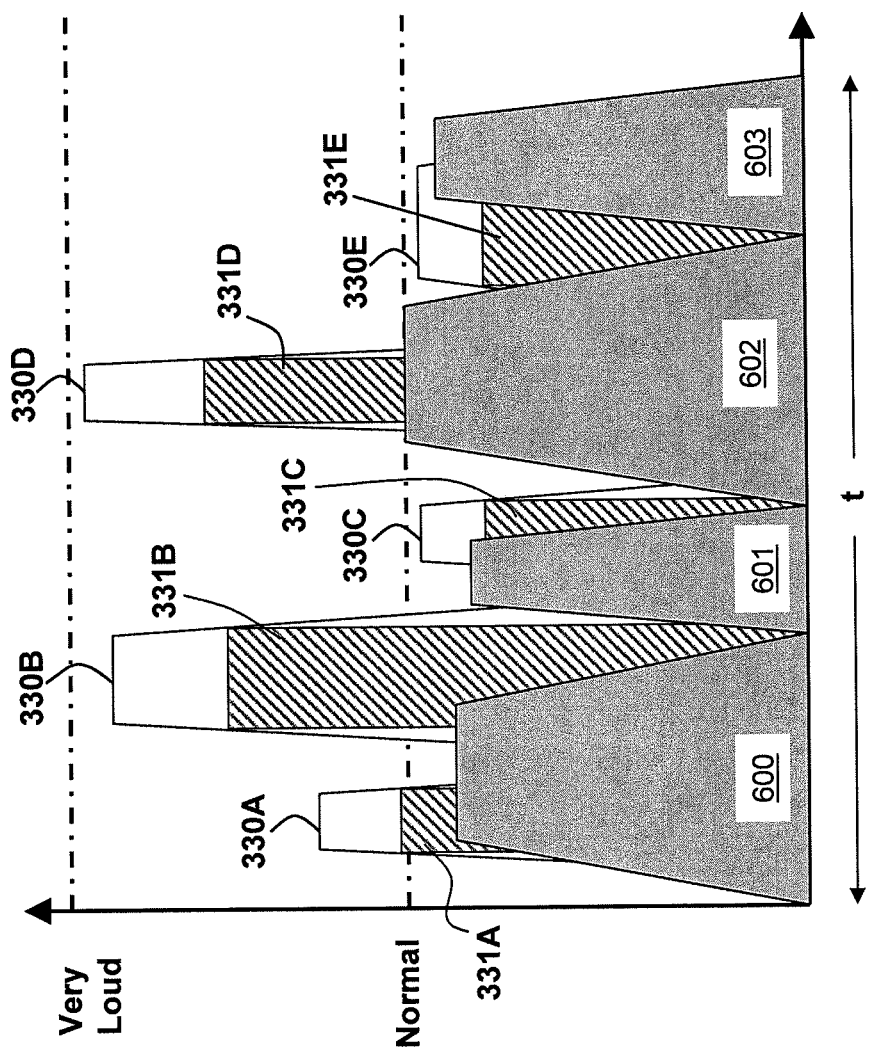
FIG. 6 illustrates yet another exemplary embodiment of an audio signal including interfering background noise captured for a predetermined period of time, where a level of engagement is determined despite the interfering noise.

Of course, conditions during normal listening periods may include levels of interfering background noise, such as traffic noise or audience noise. Turning to FIG. 6, an audio signal is illustrated having audio segments (330A-330E) and respective codes (331A-331E) captured for a predetermined period of time (t). In addition to the audio signal, interfering background noise (illustrated as segments 600A-D) is present in the same sampling period. Again, by setting a predetermined threshold for listening levels (e.g., the "Normal" and "Very Loud" lines, illustrated on the audio level y-axis of FIG. 6), listener engagement may be measured. As before, listener engagement may processed as being at normal, high, or low levels relative to the respective threshold. Also as before, the levels and/or engagement may be measured by: (1) predetermined number of peaks (audio signal and/or encoding) that exceed the threshold within the sampling period; (2) a predetermined percentage of the audio signal and/or encoding that exceeds the threshold within the sampling period; and (3) encoding levels that exceed the threshold within the sampling period.

However, once interfering background noise is introduced, additional processing may be needed to properly identify the level of listener engagement. One option is to measure the absolute sound level and its relation to the interfering background noise. More specifically, if the absolute sound level is increased relative to the interfering noise, it may be determined that the listener has an increased level of engagement. Also, comparing sampled time periods relative to previous time periods would provide additional indication whether the listener engagement has increased/decreased.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A method to determine levels of audience engagement relative to media, the method comprising:
   capturing encoded audio with an audience member's mobile device over a time period, the encoded audio corresponding to the media;
   determining a change in a characteristic of the captured encoded audio captured by the mobile device over the time period; and
   processing the change in the characteristic to calculate more than two levels of audience engagement relative to the captured encoded audio.

2. The method according to claim 1, wherein processing the change in the characteristic comprises analyzing the change in the characteristic relative a threshold for the time period, and wherein the characteristic comprises a volume level of the encoded audio.

3. The method according to claim 2, wherein processing the change in the characteristic to calculate the more than two levels of audience engagement comprises calculating at least one of (1) a number of volume level peaks exceeding the threshold within the time period in which the encoded audio is captured, or (2) a percentage of the encoded audio exceeding the threshold within the time period in which the encoded audio is captured.

4. The method according to claim 3, wherein processing the change in the characteristic to calculate the more than two levels of audience engagement further comprises comparing engagement values to a previous engagement value calculated for a previous time period in which the encoded audio was captured.

5. The method according to claim 1, wherein determining the change in the characteristic comprises determining the change relative to a threshold for the time period, and wherein the characteristic comprises an encoding level of the encoded audio.

6. The method according to claim 5, wherein processing the change in the characteristic to calculate the more than two levels of audience engagement comprises calculating at least one of (1) a number of encoding level peaks exceeding the threshold within the time period in which the encoded audio is captured, or (2) a percentage of the encoding level peaks exceeding the threshold within the time period in which the encoded audio is captured.

7. The method according to claim 1, wherein the encoded audio is captured from a (1) a broadcast source or (2) a computer network source.

8. The method according to claim 1, further comprising:
   capturing sensor information in the mobile device; and
   synchronizing the captured sensor information with the captured encoded audio.

9. The method according to claim 8, wherein the more than two levels of engagement are calculated using the captured sensor information.

10. The method according to claim 1, wherein the more than two levels of engagement comprise a high level of engagement, a normal level of engagement and a low level of engagement.

11. A mobile apparatus for determining levels of engagement with media for a user of the mobile apparatus, the mobile apparatus comprising:
 a microphone to capture encoded audio data over a time period; and
 a processor in communication with the microphone to determine a characteristic of the encoded audio data over the time period, the processor to process the characteristic to calculate more than two levels of engagement for the user relative to the captured encoded audio data.

12. The mobile apparatus according to claim 11, wherein the characteristic is determined relative to a threshold, and the characteristic comprises a volume level of the encoded audio data.

13. The mobile apparatus according to claim 12, wherein the processor is to calculate the more than two levels of engagement by at least one of (1) a number of volume level peaks exceeding the threshold within the time period in which the encoded audio data is captured, or (2) a percentage of the audio signal exceeding the threshold within the time period in which the encoded audio data is captured.

14. The mobile apparatus according to claim 13, wherein the calculation of the two or more levels of engagement further comprises comparing engagement values to a previous engagement value calculated for a previous time period.

15. The mobile apparatus according to claim 11, wherein the characteristic comprises an encoding level of the encoded audio data.

16. The mobile apparatus according to claim 15, wherein the processor is to calculate the two or more levels of engagement by calculating at least one of (1) a number of encoding level peaks exceeding a threshold within the time period in which the encoded audio data is captured, or (2) a percentage of the encoding level peaks exceeding the threshold within the time period in which the encoded audio data is captured.

17. The mobile apparatus according to claim 11, wherein the encoded audio data is captured from at least one of (1) a broadcast source or (2) a computer network source.

18. The mobile apparatus according to claim 11, further comprising a sensor to provide sensor information to the processor, the processor to synchronize the sensor information with the captured encoded audio data.

19. The mobile apparatus according to claim 18, wherein the two or more levels of engagement are calculated using the sensor information.

20. The mobile apparatus according to claim 18, wherein the two or more levels of engagement comprise a high level of engagement, a normal level of engagement and a low level of engagement.

21. A mobile device for determining levels of user engagement with media, comprising:
 a microphone to capture encoded audio data corresponding to the media over a time period, the mobile device being associated with a user;
 a storage device in communication with the microphone to store at least a portion of the captured encoded audio data; and
 a processor in communication with the microphone and the storage device, the processor to compare the encoded audio data to a non-zero threshold over the time period to determine a characteristic of the encoded audio data, the processor to process the characteristic to calculate more than two levels of the user engagement for the media.

22. The system according to claim 21, further comprising a sensor in communication with the processor, the sensor to provide sensor information about the user's actions, wherein processor is to process the sensor information together with the characteristic to calculate the two or more levels of engagement.

* * * * *

UNITED STATES PATENT AND TRADEMARK OFFICE
CERTIFICATE OF CORRECTION

| | | |
|---|---|---|
| PATENT NO. | : 8,826,317 B2 | Page 1 of 1 |
| APPLICATION NO. | : 12/425504 | |
| DATED | : September 2, 2014 | |
| INVENTOR(S) | : Krug | |

It is certified that error appears in the above-identified patent and that said Letters Patent is hereby corrected as shown below:

On the title page item [73], replace "The Nielson Company (US), LLC." with --The Nielsen Company (US), LLC.--

Signed and Sealed this
Thirtieth Day of June, 2015

Michelle K. Lee
*Director of the United States Patent and Trademark Office*